(12) United States Patent
Thakkar et al.

(10) Patent No.: US 7,433,887 B2
(45) Date of Patent: Oct. 7, 2008

(54) METHOD AND APPARATUS FOR METADATA DRIVEN BUSINESS LOGIC PROCESSING

(75) Inventors: Jigar B. Thakkar, Sammamish, WA (US); Jagan M. Peri, Redmond, WA (US); Andrey A. Zaytsev, Sammamish, WA (US); Michaeljon Miller, Bellevue, WA (US); Navin I. Thadani, Bellevue, WA (US); Youg Lu, Sammamish, WA (US); Jasjit Grewal, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 336 days.

(21) Appl. No.: 11/025,323

(22) Filed: Dec. 29, 2004

(65) Prior Publication Data

US 2006/0143193 A1 Jun. 29, 2006

(51) Int. Cl.
*G06F 7/00* (2006.01)
(52) U.S. Cl. .................................. 707/103 R
(58) Field of Classification Search .............. 707/103 R
See application file for complete search history.

(56) References Cited

U.S. PATENT DOCUMENTS 6,085,198 A * 7/2000 Skinner et al. .......... 707/103 R
6,621,505 B1 * 9/2003 Beauchamp et al. ........ 715/764

OTHER PUBLICATIONS

Chen et al., ACM International Conference Proceeding Series; vol. 49, Proceedings of the 1st international symposium on Information and communication technologies, Dublin, Ireland, pp. 267-272, Sep. 24-26, 2003.*
Le Goff et al., CMS Note, CERN, pp. 1-14, 2001.*

* cited by examiner

*Primary Examiner*—Cheyne D Ly
(74) *Attorney, Agent, or Firm*—Marshall, Gerstein & Borun LLP

(57) ABSTRACT

A metadata driven system for supporting business application software required in the middle tier for a line of business applications includes a process metadata module adapted to store a process in metadata format, wherein the process object contains logic related to an entity of the application software. The system allows for persistence of various entities like accounts, incidents, etc., and allows an end user of the business application software to create new types of entities. The system also allows the end user to perform critical business logic operations even on the new entities defined by the end user after the deployment of the business application without requiring recompilation of the business application software. The metadata driven approach allows to easily make changes to business applications and to automate quality assurance of objects built on top of the business applications.

14 Claims, 6 Drawing Sheets

METHOD AND APPARATUS FOR METADATA DRIVEN BUSINESS LOGIC PROCESSING

TECHNICAL FIELD

This patent relates generally to computer software and more particularly to business application software using the Internet.

BACKGROUND

Modern day businesses cannot function efficiently without use of state of the art technology. Specifically, computers and software are an almost essential part of most of the businesses in developed economies. Typically, businesses use a number of off the shelf business applications, such as Excel® as well a number of custom applications specifically designed for a particular aspect of the business. There are a number of industry specific software applications that are developed by software companies to be used in a particular type of businesses, such as financial services, medical services, etc.

While such industry specific software applications are generally designed with specific characteristics of particular type of business in mind, they still need to be modified to be more suitable for use by the end user. Customer relationship management (CRM) software is one such example of a business application that is often modified by either the end user or by an independent software vendor specializing in this particular type of software.

Since the development of the Internet, businesses typically use web based applications to provide distributed business solution on the Internet. In a typical web based application, a three-tier platform is used to implement the business application, wherein a web browser is the client tier, a database containing various business data used by the application is the back-end tier, and a web server and its extensions became the middle tier. The middle tier, often also known as the middleware, is responsible for a number of functionalities including, but not limited to, reading data, writing data, data access authorization, relationship validation, etc.

Middleware used for business applications demand highly customizable solutions for managing business data. Typical processes in such an application include various processes for authorization, maintaining data integrity, applying business rules, etc. Business applications also requires enforcing various relationship constraints amongst business entities during various cascading operations for security, reorganization of business divisions, updates/deletes to heterogeneous objects hierarchies, etc. As referred to in here, an entity is a metadata description of a real world concept, such as a customer or a product. The term entity and the term class can be used interchangeably to mean such definition or description of such real world concepts. An entity instance, or just an instance, is the physical data describing a particular member of the set of such entities. Similarly, a relationship constraint is a set of rules that govern how a particular relationship between two entities is traversed while performing business logic. On the other hand, cascading operations are operations related to business logic that automatically traverse various entity relationship constraints.

All cascading operations can occur on both connected and disconnected clients. However, the subset of cascading operations which change data are only trusted when they occur on the central application server. Thus, allowing customization of business processes and entity schema creates several challenges with respect to cascading operations. Therefore, there is a need to provide better middle tier platform for providing customizable business solution for managing business data.

SUMMARY

A metadata driven system for supporting business application software required in the middle tier for a line of business applications includes a process metadata module adapted to store a process in metadata format, wherein the process object contains logic related to an entity of the application software. The system allows for persistence of various entities like accounts, incidents, etc., and allows an end user of the business application software to create new types of entities. The system also allows the end user to perform critical business logic operations even on the new entities defined by the end user after the deployment of the business application without requiring recompilation of the business application software. The metadata driven approach allows to easily make changes to business applications and to automate quality assurance of objects built on top of the business applications.

An implementation of the metadata driven system allows representing a business entity, such as a business account, contact, etc., having a database schema defining the business entity, in a metadata format. The system may be adapted to define a plurality of properties of the business entity in metadata format as an entity metadata module, to serialize the entity metadata module to the application platform, to de-serialize the serialized entity metadata module and to store the de-serialized entity metadata module on the application platform. The system may be further adapted to define a process object in metadata format as a process metadata module, wherein the process object contains logic for the business entity. The system may also include a serialization module for serializing the process metadata module to the application platform, a de-serialization module for de-serializing the serialized process metadata module, and a storage module for storing the de-serialized process metadata module on the application platform.

An alternate implementation of the system may also be adapted to define an operation performed on the entity in metadata format as an operation metadata module, to serialize the process metadata module to the application platform, to de-serialize the serialized process metadata module, and to store the de-serialized process metadata module on the application platform.

DESCRIPTION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the invention.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

Network

Figure 1:
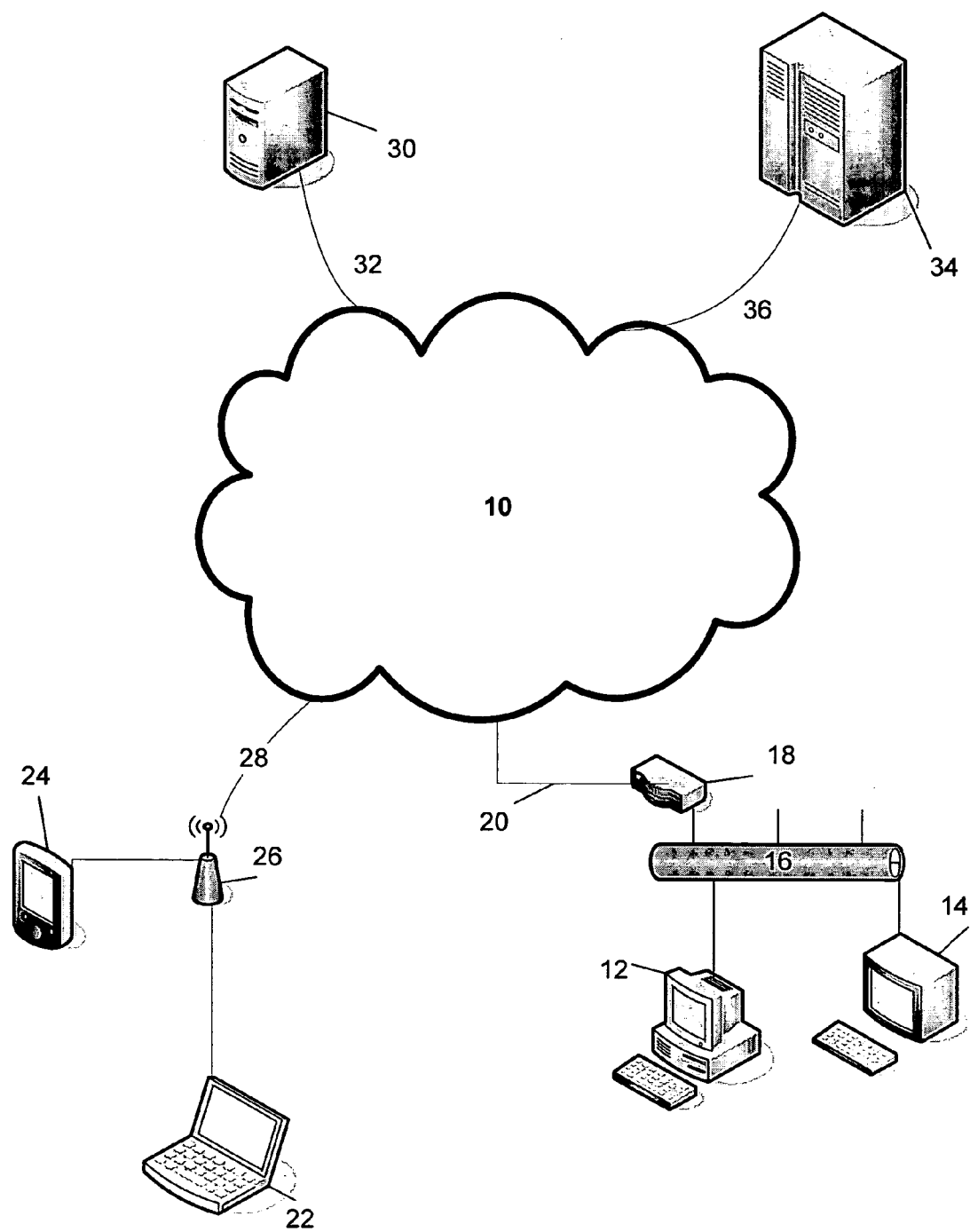
FIG. 1 is a block diagram of a network interconnecting a plurality of computing resources.

FIG. 1 illustrates a network 10 that may be used to implement an XML versioning system described herein. The network 10 may be the Internet, a virtual private network (VPN), or any other network that allows one or more computers, communication devices, databases, etc., to be communicatively connected to each other. The network 10 may be connected to a personal computer 12 and a computer terminal 14 via an Ethernet 16 and a router 18, and a landline 20. On the other hand, the network 10 may wirelessly connected to a laptop computer 22 and a personal data assistant 24 via a wireless communication station 26 and a wireless link 28. Similarly, a server 30 may be connected to the network 10 using a communication link 32 and a mainframe 34 may be connected to the network 10 using another communication link 36. As it will be described below in further detail, one or more components of the dynamic software provisioning system may be stored and operated on any of the various devices connected to the network 10.

Computer

Figure 2:
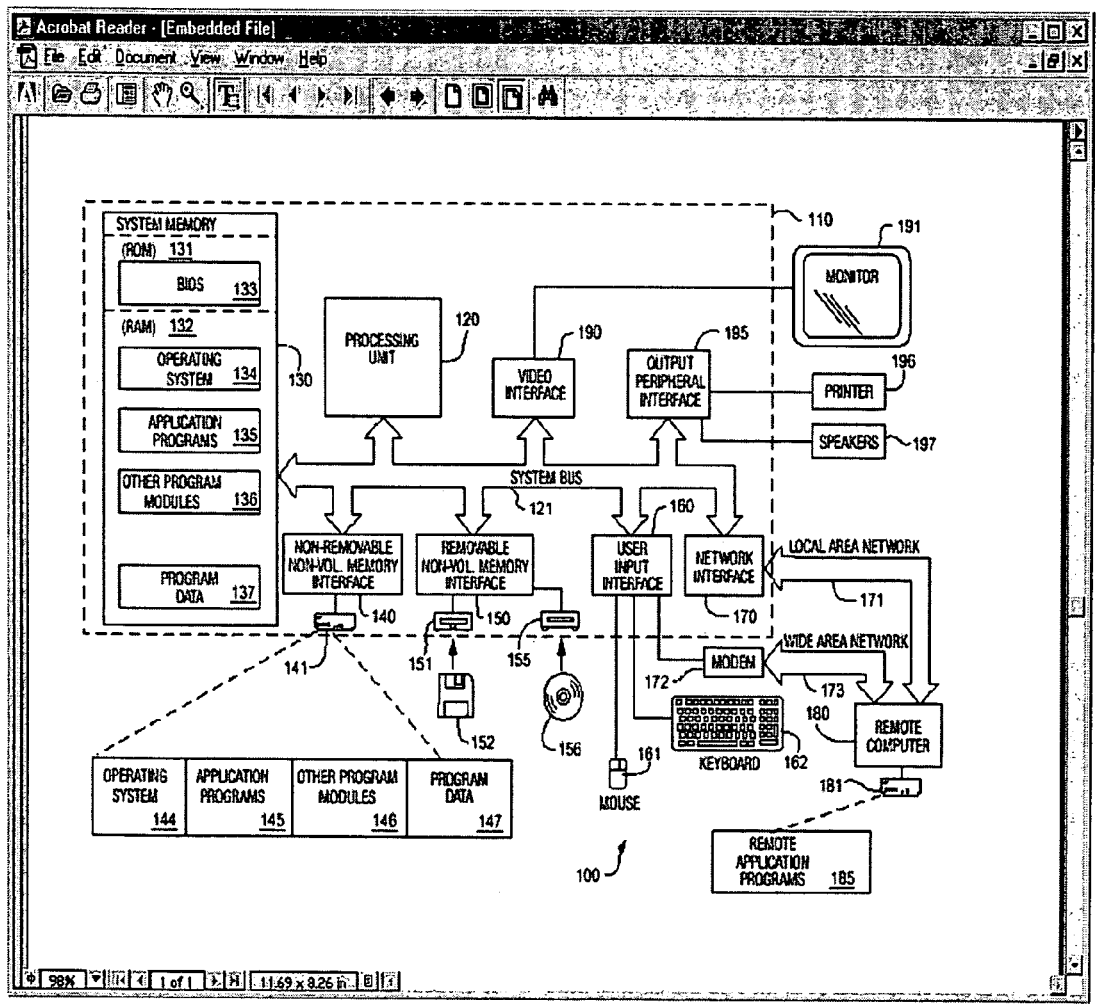
FIG. 2 is a block diagram of a computer that may be connected to the network of FIG. 1.

FIG. 2 illustrates a computing device in the form of a computer 110 that may be connected to the network 10 and used to implement one or more components of the dynamic software provisioning system. Components of the computer 110 may include, but are not limited to a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Metadata Driven Business Logic Processing

Figure 3:
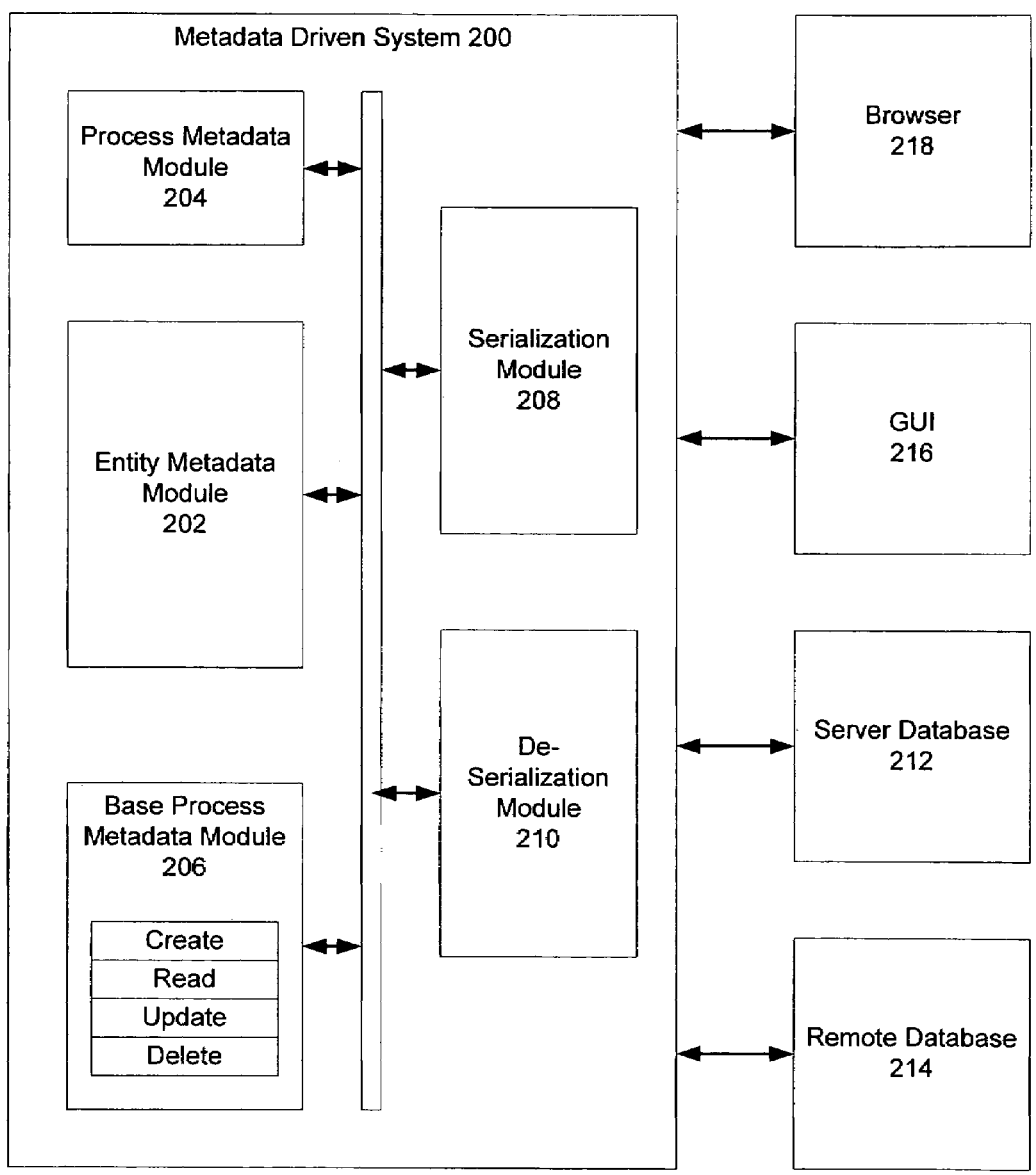
FIG. 3 illustrates a block diagram of a metadata driven system that may be used for managing applications on the network of FIG. 1.

FIG. 3 illustrates a block diagram of a metadata driven system 200 that may be used for managing various applications on the network 10 of FIG. 1. The system 200 may include an entity metadata module 202, a process metadata module 204, a base process metadata module 206, a serialization module 208 and a de-serialization module 210. The system 200 may communicate with a server database 212, a remote database 214, a graphical user interface (GUI) 216 and a browser 218. Various modules of the system 200 may be implemented on any of the various computing devices, such as the server 30, the desktop computer 12, etc., of the network 10. When implemented on the computer 110, the system 200 may be stored on the ROM 131, on the RAM 132, or any other similar location.

The system 200 may be used to implement a middleware for an application, such as a customer relation management (CRM) application that accesses various data on the server database 212 and on the remote database 214. While the system 200 is illustrated in here to implement a CRM application, any number of alternate applications can be implemented using the system 200. For example, in an alternate implementation, the system 200 may be used to implement a human resource management application on a network, such as the network 10. Other examples of applications that may be implemented using the system 200 include various business applications, such as an enterprise resource planning (ERP) system, a distributed accounting system, a material requirement planning (MRP) system, a project management system, etc.

The system 200 may use the GUI 216 and browser 218 to communicate with users of the system 200. Moreover, one or more application programs, such as the application program 135 stored on computer 110, may interact with the system 200. The system 200 may communicate with the various devices on the computer 110 using the system bus 121, or any other manner well known to those of ordinary skill in the art. Similarly, the system 200 may communicate with various devices on the network using the local area network 171, the wide area network 173, etc.

Now referring to the specific components of the system 200, the entity metadata module 202 may define various properties of an entity used by an application. Such an entity may be, for example, an account table for customer account data of a CRM application, a sales table for sales data in an inventory management application, etc. As it is well known to those of ordinary skill in the art, metadata in general represents information about entities and their relationships. The entity metadata module 202 may include properties of various entities, including properties for various entities created by an end user or by an independent software vendor (ISV). Examples of some of the properties that may be represented by the entity metadata module 202 may be the data type of the entity, the size of the entity, security information regarding the entity, relationship of the entity with other entities, etc. Whereas, the block diagram in the FIG. 3 illustrates only one block for entity metadata module 202, it is to be understood that in an implementation of the system 200, the structure of the entity metadata module 202 may be highly complex, including different entity metadata modules for different entities, where one or more of such plurality of entity metadata modules may be interrelated to each other.

The process metadata module 204 may represent various processes related to an entity. For example, when an entity represents a contract, that provides information regarding a sales contract, a process related to the contract entity may be a contract renewal process, which may involve business logic and may be implemented by a ContractProceeObject.Review( ) method. In this case, the process metadata module 204 may represent the ContractProceeObject.Review( ) method. If a process represented by the process metadata module 204 needs one or more sub-processes, such sub processes may also be provided within the process metadata module 204.

The process metadata module 204 may include various processes developed by an original developer of an application using the entity and supplied with the initial implementation of the application. However, a user, an ISV, etc., also may develop and provide additional processes that may be added to the process metadata module 204. In such a situation, the process metadata module 204 may include metadata representing information about the additional processes and other information which may be necessary to create and/or invoke instances of such additional business processes.

Allowing a third party vendor to develop and provide one or more processes using the process metadata module 204 allows adding different functionalities to an application without having to compile and deploy such added functionalities into the application. Moreover, if an ISV adds an entity to an application, while the properties of such added entity are stored in the entity metadata module 202, various processes to be performed upon such added entity may be stored in the process metadata module 204.

The base process metadata module 206 stores various basic processes that may be used by various processes of an application, including the processes stored in the process metadata module 204. For example, the base process metadata module 206 is shown to include a create process, a read process, an update process and a delete process, are shown in FIG. 3. However, many more base processes related to security, data persistence, etc., may also be stored in the base process metadata module 206. Thus for example, the ContractProceeObject.Review( ) method stored on the process metadata module 204 may call an update process from the base process metadata module 206 to update a contract entity, where the properties and relationships of such contract entity may be stored on the entity metadata module 204.

The serialization module 208 may include processes for converting an in-memory object representation of an entity into a format that can be sent over a network or saved to be disk or other storage media. Similarly, the de-serialization module 210 may include a de-serialization process for converting data from a memory or data received from a network into an in-memory object representation, which can be used by one or more processes stored on either of the process metadata module 204 and the base process metadata module 206.

Figure 4:
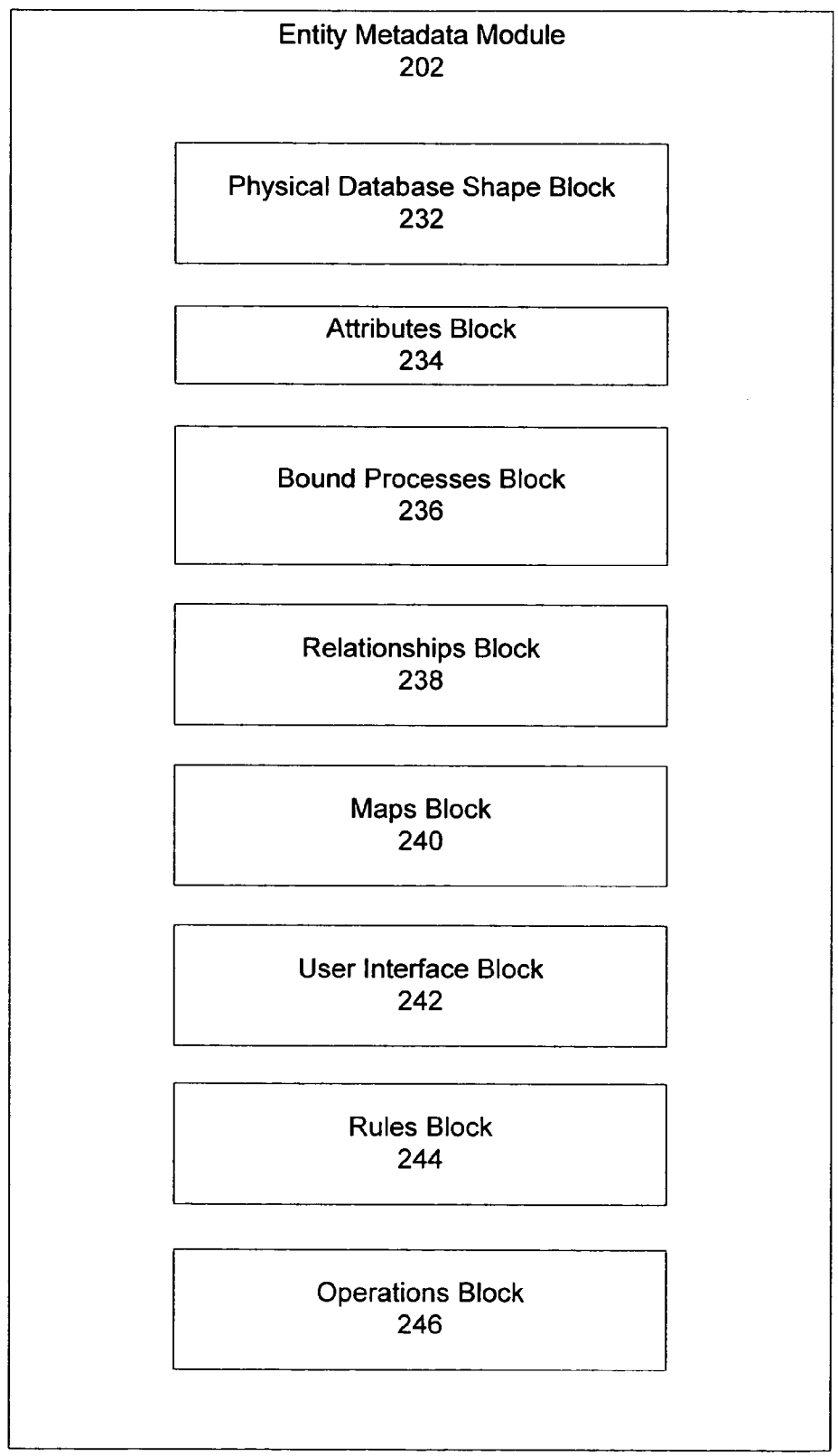
FIG. 4 illustrates a block diagram of an entity metadata module that may be used by the metadata driven system of FIG. 3.

FIG. 4 illustrates a detailed block diagram of various components that may be stored in the entity metadata module 202 of FIG. 3. As discussed above, the entity metadata module may be used to store information about various entities created during the original design of the application as well as information about various entities that may be added by an ISV or a user of the application. While FIG. 4 illustrates various information stored in the entity metadata module in different blocks, a person of ordinary skill in the art would recognize that one or more of these blocks may be merged together or one or more of these blocks may be further divided into various sub-blocks. Moreover, each of these blocks may access information from the other blocks by using a common communication bus such as the system bus 121 of the computer 110.

More specifically, the entity metadata module 202 may include a physical shape block 232, an attribute block 234 including various attributes of the various entities, a bound processes block 236 including various processes bound to the various entities, a relationship block 238 including various relationships of—and between—the various entities, a maps block 240 including entity maps for the various entities, a user interface block 242 including various user interfaces used with the various entities and a rules block 244 including various rules regarding one or more of the various entities.

The physical shape block 232 may store definitions of various entities' physical database shape such as table definitions, view definitions, etc, in the metadata format. For example, when for a customer entity related to a CRM application, the physical shape block 232 may store information regarding the number of columns in a customer table, the memory address for the customer table, etc.

The attributes block 234 may store various information related to the attributes of the entities in the metadata format. For example, a security attribute of an entity may specify whether a user or a process has a security privilege to view or change information about the entity. One or more attributes of an entity may be specified by the original designer of an application and/or by an ISV. Moreover, for certain entities such attributes may be changed by a user and for other entities such attributes may not be changed by the users.

The bound processes block 236 may specify processes bound to various entities in the metadata format, where such processes may be stored in the process metadata module 204, the base process metadata module 206, or in some other format. An example of a process bound to a customer entity may be a "generate e-mail" process that causes the application to generate an e-mail at every fixed period. Another example of a process bound to a sales person entity may be an "update location" process that updates a local phone number of a sales person every time the application receives travel information related to the sales person.

The relationships block 238 may specify, in the metadata format, various relationships between the various entities related to the application. For example, in a human resource application implemented by the system 200, the relationship block 238 may specify that a relation between a manager and an employee is one-to-many, whereas a relation between a manager and a secretary is one-to-one. The relationship block 238 may also specify relationships for entities added by an ISV or by a user.

The maps block 240 may specify, in the metadata format, various rules for constructing other entities based on various existing entities in an application. For example, the maps block 240 of an accounting system may specify rules for creating an invoice entity based on a customer entity, a product entity, a sales tax entity, etc.

The user interface block 242 may specify, in the metadata format, various layouts, views, pick-lists, etc., for entities related to an application. For example, the user interface block 242 related to a particular raw material entity in a MRP application may specify that the pick-list for that particular raw material should list the most commonly used materials at the top of a pick-list or that the most cost effective shipping alternative for that material at the top of a pick-list, etc.

The rules block 244 may specify, in the metadata format, various rules related to one or more entities in an application, such as a validation rule, a cardinality rule, etc. For example, the rules block 244 of a CRM application may specify that any update to a customer refund entity higher than a first amount must be validated by a manger entity. As another example, a validation rule stored in the metadata format in the rules block 244 for a human resources application may specify that any update to an employee bonus entity must be validated by two manager entities.

Furthermore, the entity metadata module 202 may also include an operations block 246 describing various operations related to entities of the target application. For example, the operations block 246 may store a create operation including requirements for offline playback support, offline transaction support, etc. Similarly, the operations block 246 may also store a retrieve operation including information that the retrieve operation does not need offline playback support, offline transaction support, etc.

Figure 5:
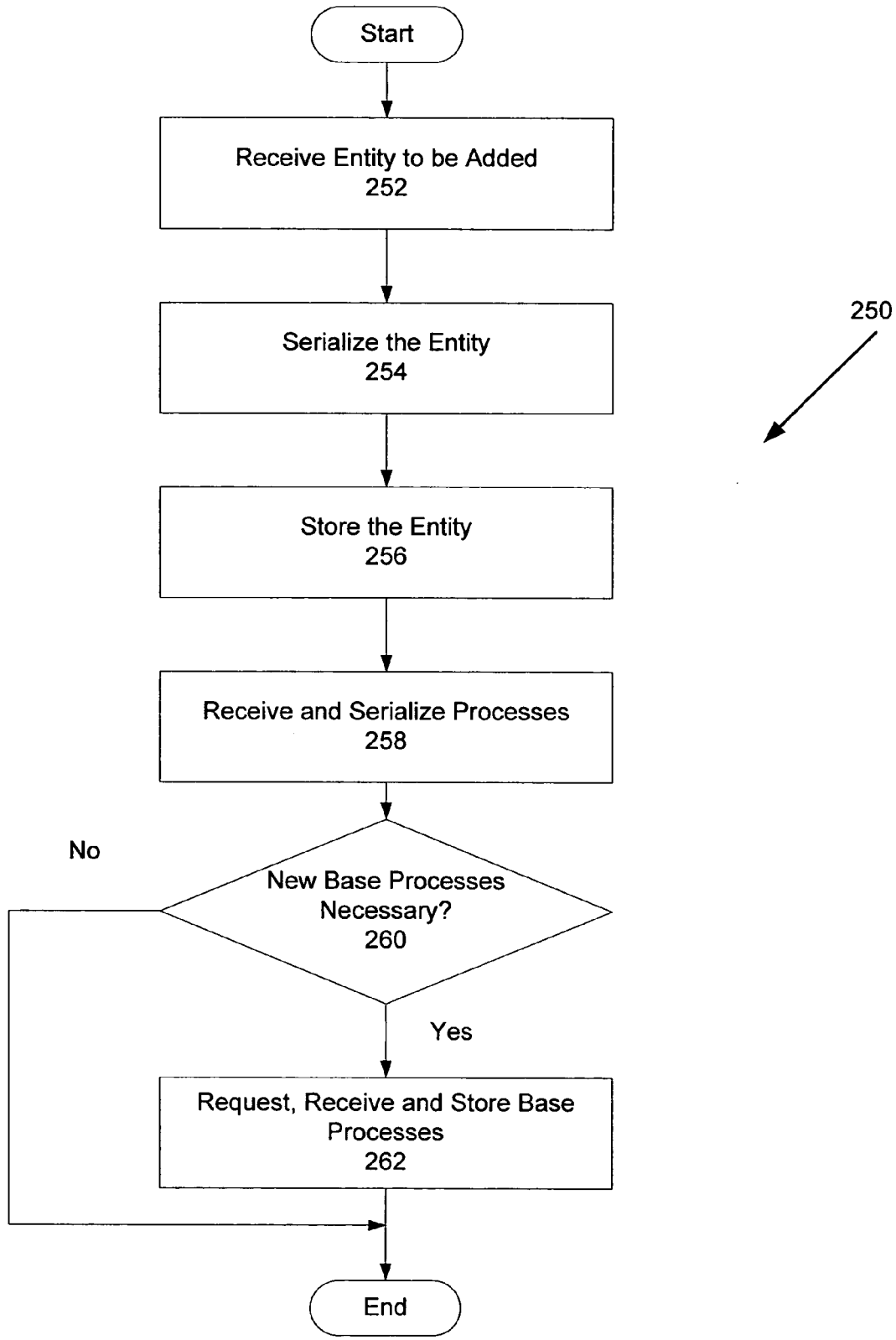
FIG. 5 illustrates a flowchart for generating a metadata module to be used by the metadata driven system of FIG. 3.

Now referring to FIG. 5, a program 250 illustrates a method of generating various metadata modules to be used by the metadata driven system of FIG. 3. Specifically, the program 250 illustrates adding a new entity to an existing application and adding a process related to the newly added entity. At a block 252 the program 250 may receive an entity that needs to be added to the application. For example, if an existing application is a CRM application, an ISV may be interested in adding a housing status entity representing customer's housing information, i.e., whether the customer is an owner or a renter, etc.

At a block 254, the program 250 serializes the newly received object/entity so that it may now be stored on the memory. At a block 256, the program 250 stores the newly received entity into the entity metadata module 204. Note that the program 250 may also store various properties and relationships defining the newly created housing status entity into the entity metadata module 204. For example, one of such property may be that the housing status can take only one of four different statuses (such as: own, rent, dependent and other). Similarly, another property of the newly added entity may be the relational key of the newly created entity.

Subsequently, at a block 258, the program 250 receives and serializes various processes related to the newly created housing status entity. For example, one such process may be to update the housing status. However, it may be that updating the status may be connected to a number of other processes based on a number of different rules, such as: upon a change of housing status from rent to own, initiate a review of the credit status, generate a first set of marketing material, etc. As the entity metadata module 202 may already have information regarding relationships and properties of other entities affected by such process, it is easy to implement such new processes without having to compile the entire application. Moreover, as the properties of the newly added housing status entity are added to the entity metadata module 202, the newly added entity also is accessible by the other processes.

Subsequently, at a block 260, the program 250 determines if any of the processes related to the newly created entity requires any of the base processes such as create, read, update, delete, etc. If it is determined that one or more such base processes are necessary, at the block 260 the program 250 ensures that all such base processes are available in the base process metadata module 206. If it is determined that one or more base processes are not available in the base process metadata module 206, at a block 262 the program requests, receives and stores such base processes into the base process metadata module 206.

Figure 6:
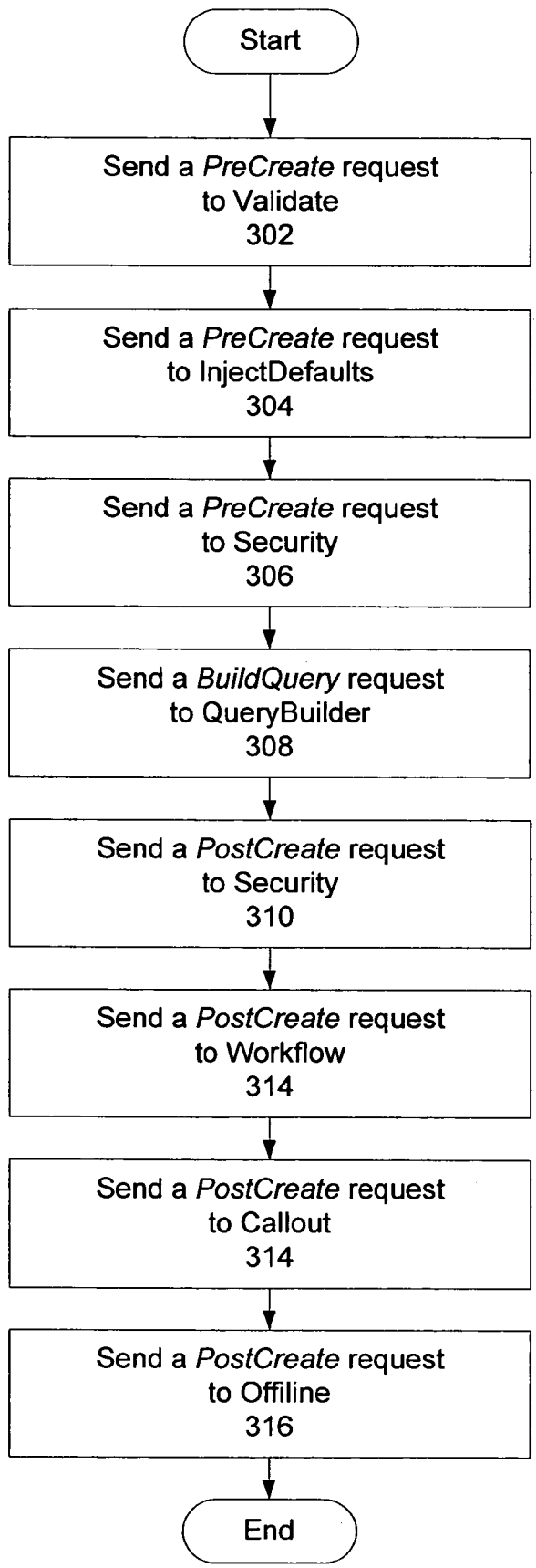
FIG. 6 illustrates a flowchart for using the metadata driven system of FIG. 3.
Figure 6:
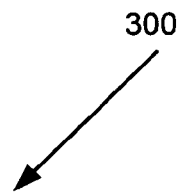

Now referring to FIG. 6, a program 300 illustrates a method of using the metadata driven system 200. For illustration purposes, the program 300 only illustrates using the metadata driven system 200 for executing an insert request, however, other requests or complex processes may also be implemented using the metadata driven system 200. Such a request may be performed by a business process defined using the process metadata module 204, wherein the business process requires a create operation to be performed on a business entity stored on the entity metadata module 202 to create a query on the business entity. The program 300 uses various base processes stored on the base process metadata module 206 to perform the business process. The program 300 may use various extensions of the entities for which the insert request is to be executed, wherein the such extensions may also be stored in the entity metadata module 202 related to that entity. Generally, the extensions of an entity may be implemented during the design of an application or by ISVs or users of the application.

At a block 302, the program 300 may send a PreCreate request to a Validate base process stored on the base process metadata module 206 to validate various attributes of an entity instance on which the create process is to be performed.

Next, at a block 304, the program 300 may send another PreCreate request to an InjectDefaults base process stored on the base process metadata module 206 to set customer defined values for various attributes of the entity instance. For example, the default value of the home status may be "rent," and if no value is assigned to the entity instance, the InjectDefaults base process may add such default value to the entity instance.

Subsequently, at a block 306, the program 300 may send a PreCreate request to a Security base process stored on the base process metadata module 206 to obtain security permissions for the entity on which the create process is to be performed. The program 300 may use a security extension of the entity to validate that a user has appropriate permission to perform the create process.

While in the present case for the create process, the program 300 performs only a single level security check, in an alternate case, a two level security check may be performed where the program 300 first may check that a user has a permission to perform a requested process against a class of instances defined by the entity and subsequently, the program 300 may perform an entity instance specific check to ensure whether the user has a permission to perform the requested process on the particular instance of the entity. Note that in the case of a create process, there is no existing instance of the entity, and therefore, only one level of security check may be sufficient.

At a block 308, the program 300 may send a BuildCreate request to a QueryBuilder process stored on the process metadata module 204 to create an instance of the entity.

Subsequently, at a block 310, the program 300 may send a PostCreate request to the Security base process stored on the base process metadata module 206 to store security permissions for the entity on which the create process is to be performed.

At a block 312, the program 300 may send a PostCreate request to a Workflow base process stored on the base process metadata module 206 to allow various customer defined business processes to run outside the scope of the current operation. The Workflow base process is an example of a process that allows an ISV or a user of an application to develop business rules/actions to be taken in response to certain events related to the system containing the entity. For example, a user of a sales force management system can create a workflow process that triggers sending an e-mail every time a new sales opportunity or sales lead is entered into the sales force management system.

Subsequently, at a block 314, the program 300 may send a PostCreate request to a Callout base process stored on the base process metadata module 206 to notify other systems which have subscribed to the Create process execution allowing them to execute any existing or new business logic.

At a block 316, the program 300 may send a PostCreate request to an Offline base process stored on the base process metadata module 206 to store the request, if required by the system's current connection state, for subsequent playback to the central server when a reliable connection is reestablished. Note, that the step 316 allows storing the request when the create operation is performed on a disconnected client for later playback when a connection to a central application server is established, such storing may not be necessary in case of an operation being performed at the central application server.

A person of ordinary skill in the art would appreciate the advantages of the metadata driven system 200 described above for a business application that may need frequent updating and custom development capabilities. Making the business application metadata driven provides tremendous value in terms of allowing customization and support for customization, without having to perform compilation of the business application after each customization. Specifically, by making various processes, such as validation, authorization, persistence, etc., metadata driven, the metadata driven system 200 described in here makes it extremely easy to customize business applications, thus reducing cost of development and maintenance of business applications.

The metadata driven system 200 also makes internal development of new entities with business logic easier. Because updating metadata via some tools is much easier than updating and compiling code for a business application and deploying the updated code on a cluster of servers and clients, the metadata driven system 200 allows making design changes to business applications easier. Similarly, because it is easier to use metadata to automate tests and compare outcome of tests with desired results, automated test processes for quality assurance of business applications can be easily added to the process metadata module 204.

Although the forgoing text sets forth a detailed description of numerous different embodiments of the invention, it should be understood that the scope of the invention is defined by the words of the claims set forth at the end of this patent. The detailed description is to be construed as exemplary only and does not describe every possible embodiment of the invention because describing every possible embodiment would be impractical, if not impossible. Numerous alternative embodiments could be implemented, using either current technology or technology developed after the filing date of this patent, which would still fall within the scope of the claims defining the invention.

Thus, many modifications and variations may be made in the techniques and structures described and illustrated herein without departing from the spirit and scope of the present invention. Accordingly, it should be understood that the methods and apparatus described herein are illustrative only and are not limiting upon the scope of the invention.

What is claimed is:

1. A method of implementing a metadata driven system for business program customization, wherein the system includes a processor coupled to a memory, a plurality of entity metadata modules, and process metadata modules; the method comprising:

storing on the memory a description of a first entity in metadata form as a first entity metadata module, wherein the first entity metadata module includes a plurality of properties defining the first entity, relationship information defining a relationship between the first entity and a second entity, and rules for modifying the first entity with regards to the second entity or for constructing a third entity in relation to the first entity;

storing on the memory a metadata description of a first process involving an instance of the first entity as a first process metadata module, wherein the first process metadata module contains logic that operates on the first entity instance;

storing on the memory a metadata description of a second process involving an instance of the second entity as a second process metadata module, wherein the second process metadata module contains logic that operates on the second entity instance;

storing a first process executive in the first process metadata module, wherein the first process executive provides a routine for interpreting the logic related to the first entity instance;

storing a second process executive in the second process metadata module, wherein the second process executive provides a routine for interpreting the logic related to the first entity instance;

adding the first process metadata module and the second process metadata module to the program; wherein the program executes the first process metadata module on the first entity instance and executes the second process metadata module on the second entity instance, wherein the executing does not require compiling the first process metadata module and the second process metadata module; and storing a result of the executed processes on the memory.

2. The method of claim 1, further comprising defining an operation to be performed on the first entity in metadata format as an operation metadata module.

3. The method of claim 2, further comprising:
    (a) serializing at least one of: (1) the process metadata module, (2) the first entity metadata module and (3) the operation metadata module;
    (b) communicating at least one of: (1) the serialized process metadata module, (2) the serialized first entity metadata module and (3) the serialized operation metadata module to the application platform;
    (c) de-serializing at least one of: (1) the serialized process metadata module, (2) the serialized first entity metadata module and (3) the serialized operation metadata module at the application platform; and
    (d) storing at least one of: (1) the de-serialized process metadata module, (2) the de-serialized first entity metadata module and (3) the de-serialized operation metadata module on the application platform.

4. The method of claim 3, wherein the operation performed on the first entity is one of: (1) create; (2) update; and (3) delete.

5. The method of claim 4, wherein the operation metadata includes information about the operation performed on the first entity, the information comprising:
    (a) whether the operation requires support for offline processing;
    (b) whether the operation needs to be performed inside an atomic transaction; and
    (c) whether the operation requires a one-step or two-step security permission.

6. The method of claim 1, wherein the operation performed on the first entity is performed on a remote computing device disconnected from the application platform.

7. A method of claim 2, wherein the operation performed on the first entity is a cascading operation.

8. The method of claim 1, wherein the process metadata module includes at least one of: (1) existing logic for the first entity and (2) a new logic for a newly added entity.

9. The method of claim 1, further comprising creating a plurality of metadata driven extensions for the first entity including at least one of: (1) a validate extension; (2) an inject defaults extension; (3) a security extension; (4) a workflow extension; (5) a callout extension; and (6) an offline extension.

10. The method of claim 9, wherein the process metadata module is further adapted to communicate with at least one of the plurality of metadata driven extensions.

11. A metadata driven computer system for business program customization comprising:

a display unit that is capable of generating video images;

an input device;

a processing apparatus operatively coupled to the display unit and the input device, the processing apparatus comprising a processor and a memory operatively coupled to the processor;

a network interface connected to a network and to the processing apparatus;

the processing apparatus being programmed to:

store a representation description of a first entity in metadata form as a first entity metadata module, wherein the first entity metadata module includes a plurality of properties of the first entity in metadata format, relationship information defining a relationship between the first entity and a second entity, and rules for modifying the first entity with regards to the second entity or for constructing a third entity in relation to the first entity;

store a first process in metadata format as a first process metadata module, wherein the first process metadata module contains logic that operates on an instance of the first entity;

store a second process in metadata format as a second process metadata module, wherein the second process metadata module contains logic that operates on an instance of the second entity;

store a base process metadata module adapted to store a plurality of basic data processes;

store a serialization module adapted to serialize the first and second entity metadata modules, the first and second process metadata modules and the base process metadata module; and store a de-serialization module adapted to de-serialize the first and second entity metadata modules, the first and second process metadata modules and the base process metadata module;

add the first process metadata module and the second process metadata module to the program; wherein the program executes the first process metadata module on the first entity instance and executes the second process metadata module on the second entity instance, wherein the executing does not require compiling the first process metadata module and the second process metadata module; and storing a result of the executed processes on the memory.

12. The system of claim 11, wherein the plurality of basic data processes include at least one of: (1) a create process; (2) an update process; and (3) a delete process.

13. The system of claim 12, wherein the process includes at least one of: (1) existing logic for the entity and (2) a new logic for a newly added entity.

14. A system of claim 12, wherein:

the serialization module is further adapted to (a) communicate with an entity database and with a graphical user interface and (b) to serialize the first entity metadata and the process metadata module into XML strings; and the de-serialization module is further adapted to communicate with a remote client hosting a graphical user interface and with a server having an entity database.

* * * * *

UNITED STATES PATENT AND TRADEMARK OFFICE
CERTIFICATE OF CORRECTION

| | |
|---|---|
| PATENT NO. | : 7,433,887 B2 |
| APPLICATION NO. | : 11/025323 |
| DATED | : October 7, 2008 |
| INVENTOR(S) | : Jigar B. Thakkar et al. |

It is certified that error appears in the above-identified patent and that said Letters Patent is hereby corrected as shown below:

In column 12, line 50, in Claim 6, delete "claim 1," and insert -- claim 2, --, therefor.

Signed and Sealed this
Fourteenth Day of August, 2012

David J. Kappos
*Director of the United States Patent and Trademark Office*